Dec. 14, 1965   F. W. MEADOWS ETAL   3,222,747
MACHINES FOR OPERATING ON BLANKS OF CERAMIC WARE
Filed Nov. 30, 1962   8 Sheets-Sheet 1

Fig 1

Dec. 14, 1965   F. W. MEADOWS ETAL   3,222,747
MACHINES FOR OPERATING ON BLANKS OF CERAMIC WARE
Filed Nov. 30, 1962   8 Sheets-Sheet 2

3,222,747
MACHINES FOR OPERATING ON BLANKS
OF CERAMIC WARE
Frank William Meadows and Norman Pearce, Stoke-on-Trent, England, assignors to Service (Engineers) Limited, Stoke-on-Trent, England, a British company
Filed Nov. 30, 1962, Ser. No. 241,235
Claims priority, application Great Britain, Dec. 8, 1961, 44,055/61
14 Claims. (Cl. 25—24)

This invention is concerned with improvements in or relating to machines for operating on blanks of ceramic ware in the manufacture of pottery, more especially machines suitable for use in smoothing the outer surfaces of hollow-ware blanks in order to remove disconformities therefrom. The term "hollow-ware" where used herein is to be understood as referring to cups and similar articles as opposed to plates and saucers which are customarily referred to in the industry as "flat-ware."

In the manufacture of pottery it is customary, in the shaping of hollow-ware articles, to form moist clay with the aid of a tool against a concave surface of a mould, and subsequently, after drying the ware to what is known as the "green" state (in which state the moisture content may be of the order of 15–18% water on a dry basis) and after removal of the ware from the mould, to smooth the outer surface of the ware whereby to remove any disconformities therefrom. This operation, when carried out on cup blanks, i.e. blanks for cups the handles of which are not yet attached thereto, is customarily performed by hand using a wet sponge.

It is one of the various objects of the present invention to provide an improved machine suitable for use in smoothing the outer surfaces of hollow-ware blanks in the manufacture of pottery.

There is hereinafter described, to illustrate the invention by way of example, a machine suitable for use in smoothing the outer surfaces of cup blanks, this illustrative machine comprising a work support in the form of a chuck mounted on a rotatable spindle and arranged to grip an inverted cup blank placed thereover, means for effecting rotation of the spindle on which the chuck is mounted, operating instrumentalities arranged to operate on the outer surface of a blank supported on the chuck, and an edge gauge comprising a plurality of (viz. three) pads arranged to engage the top edge, i.e. the rim at the open end, of an inverted cup blank supported on the chuck so that the cup blank assumes a correct heightwise position relative to the positions of the operating instrumentalities of the machine, said operating instrumentalities comprising a first tool operative to smooth the convex side wall of the cup blank, a second tool operative to smooth the bottom, i.e. the closed end, of the cup blank and a third tool operative to trim the top edge of the cup blank in the operation of the machine, the first and second tools comprising work-engaging elements in the form of sponges and the third tool comprising a work-engaging element constituted by a suitably shaped abrasive stone.

The machine also comprises a main cam shaft which is caused to complete one revolution for each cycle of operation of the machine, there being mounted on the cam shaft for rotation therewith a plurality of cams, viz. a first cam effective to control movement of the first tool during part of its operation on the convex side walls of cup blanks, a second cam effective to move the second tool into and out of engagement with the bottoms of cup blanks, and a third cam effective to move the third tool into and out of engagement with the top edges of cup blanks, each cam being arranged to operate once during each cycle of operation of the machine. Another cam is mounted on a main drive shaft of the machine, which shaft imparts drive to the main cam shaft and rotates at the same speed as the cam shaft, the other cam being effective, in each cycle of operation of the machine, to raise and lower the chuck relative to the edge gauge and to cause a clutch arrangement to be engaged and disengaged whereby to impart rotational movement to the chuck in the operation of the machine.

The main cam shaft of the machine is connected, and imparts drive, by means of a belt drive together with two gears, to a horizontal shaft which effects rotational movement of the first tool, the arrangement being such that the shaft is caused to rotate through one third of a revolution during each cycle of operation of the machine. The first tool of the machine comprises a circular housing that provides a support for three arms each of which supports a flexible work-engaging element in the form of a sponge, the sponge being thus carried in turn through an operating locality in which the convex side wall of a cup blank supported on the chuck is stroked thereby, the arrangement being such that, in each cycle of operation of the machine, the side wall of a cup blank supported on the chuck is operatively engaged by one of the sponges of the first tool. The machine also comprises a water trough and a squeeze-roll both of which are arranged to lie in the path of the sponges. As the first tool is caused to rotate on the shaft each successive sponge is wetted and subsequently surplus water is squeezed therefrom as the sponge engages the squeeze roll.

Towards the end of a cycle of operation of the machine, after the side wall of the cup blank supported on the chuck has been operated upon, it has been found advantageous to smooth the top edge of the cup blank with a sponge. The machine also comprises means for checking the rotation of the first tool and for reversing the direction of rotation thereof. A pulley which forms part of the belt drive and one of the gears which drive the shaft on which the first tool is mounted are fixedly mounted on a stub shaft which in turn is supported at an intermediate portion of a lever one end portion of which is pivotally mounted on the said shaft. The other end portion of the lever carries a cam follower which is held in engagement with the first cam, the arrangement being such that the cam urges the lever and thus the gear and pulley in a direction opposite to the direction of rotation of the shaft. Accordingly, rotation of the first tool is momentarily checked and the direction thereof reversed for a few degrees of revolution causing an upper surface of a sponge to engage the top edge of the cup blank.

The chuck of the machine comprises a deformable rubbery annulus made of plasticized polyvinyl chloride that can be accommodated within a cup blank and can be compressed axially whereby to cause it to expand radially and thus to grip the cup blank by engagement of the annulus with the inner wall of the blank. The chuck is arranged to be operated by air under pressure and for this purpose air passages are provided in a rotatable spindle on which the chuck is mounted and in a supporting sleeve member in which the spindle is supported for rotation, the sleeve member being arranged to be connected to a suitable source of supply of air under pressure.

The machine is arranged to operate continuously at a rate of between 8 and 18 blanks per minute, a variable speed pulley being provided in the drive arrangement for varying the rate of operation. The operator loads a cup blank to be operated upon on the chuck, the top edge of the blank being brought into engagement with the edge gauge in order correctly to position the blank on the chuck; the chuck at this stage in the operation of the machine is stationary by virtue of the clutch being disengaged and the rubbery annulus thereof in a non-expanded condition. The first tool of the machine rotates continuously about its axis in the operation of the machine.

As one sponge thereof is being, or has just been, squeezed by the squeeze-roll, a second sponge is about to enter, or has just entered, into the water trough, and the third sponge is being brought into an operating locality in which it strokes the side wall of the cup blank gripped by the chuck. The blank is lifted by the chuck from the edge gauge prior to the engagement of the sponge with the blank, and rotation of the chuck is effected simultaneously with the lifting of the blank from the edge gauge. At the same time the second and third tools are brought into operative engagement with the bottom and the top edge of the blank respectively. As stated above, towards the end of the cycle of operation, when the side wall of the blank has been operated upon, the direction of rotation of the first tool is momentarily checked and reversed for a few degrees of revolution whereby to smooth the top edge of the blank by engagement therewith of the sponge. The second and third tools are moved back to their respective inoperative positions and the chuck is returned to its lowered position; the clutch is thus disengaged, and the annulus restored to its non-expanded condition, releasing the blank which is then unloaded by the operator and replaced with another blank to be operated upon prior to the start of the next cycle of operation of the machine.

The invention provides, as one of its several features, a machine suitable for use in smoothing the outer surfaces of hollow-ware blanks in the manufacture of pottery comprising a rotatable work support on which a blank may be gripped, means for effecting rotation of the work support, an arm arranged to support a flexible work-engaging element, means whereby, in a cycle of operation of the machine, relative movement is caused to take place between the work support and said arm in such a manner that a blank gripped on the work support is stroked, from the bottom to the top edge thereof, by the work-engaging element, and means for checking said relative movement and for reversing the direction thereof whereby to bring the work-engaging element into operative engagement with the top edge of the blank to perform a smoothing operation thereon.

The invention provides, as another of its several features, a machine suitable for use in smoothing the outer surfaces of hollow-ware blanks in the manufacture of pottery comprising a rotatable work support on which a blank may be gripped, means for effecting rotation of the work support, and operating instrumentalities arranged to operate on the outer surface of a blank gripped on the work support, said operating instrumentalities comprising a first tool arranged for rotation about an axis arranged transversely of the axis of rotation of the work support and comprising a plurality of work-engaging elements spaced equidistantly about said axis, the work-engaging elements being brought, in turn, in the operation of the machine, into an operating locality in which the side wall of a blank gripped on the work support is stroked thereby to perform a smoothing operation thereon, the arrangement being such that, in each cycle of operation of the machine, the side wall of a blank gripped on the work support is stroked by one of the work-engaging elements of the first tool.

The invention provides, as another of its several features, a machine suitable for use in smoothing the outer surfaces of hollow-ware blanks in the manufacture of pottery comprising a rotatable work support on which a blank may be gripped, means for effecting rotation of the work support, an arm arranged for rotation in the operation of the machine and arranged to support a work-engaging element in the form of a sponge, and a water trough and a squeezing arrangement arranged to lie in the path of rotation of the work-engaging element, the construction and arrangement of the machine being such that, in the operation thereof, as the arm rotates, a work-engaging element supported thereon is brought into an operating locality in which it strokes the side wall of a blank gripped on the work support, subsequently enters the water trough and then passes through the squeezing arrangement to remove any surplus water therefrom.

There now follows a detailed description, to be read with reference to the accompanying drawings, of the machine. It is to be understood, however, that this machine has been selected to illustrate the invention by way of example and it is not to be understood as limiting the invention in any way.

Figure 4:
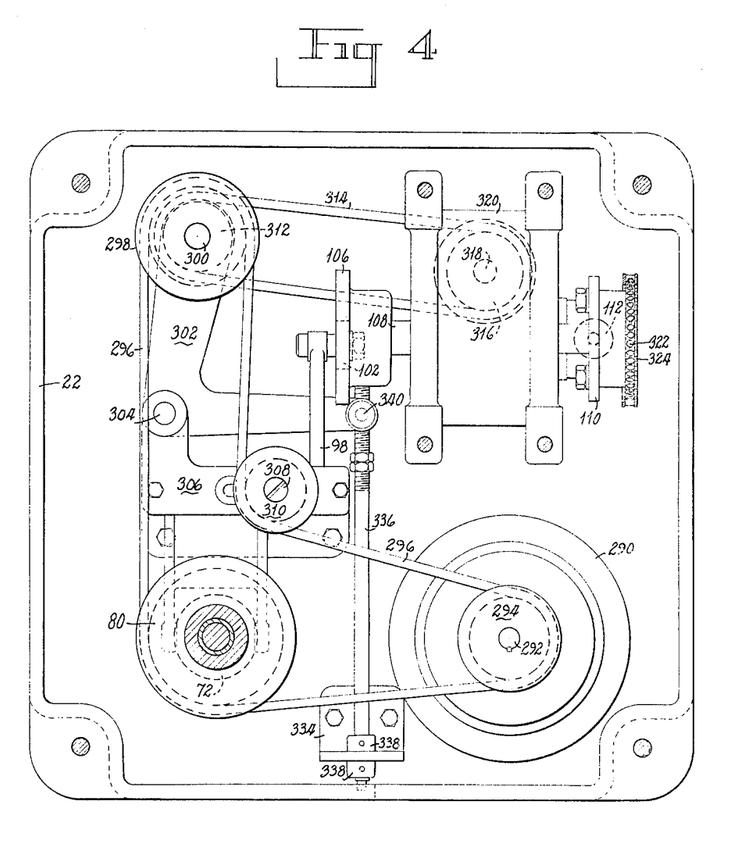
FIGURE 4 is a plan view, partly in section and with parts broken away, showing a motor and parts of the drive of the machine.
Figure 5:
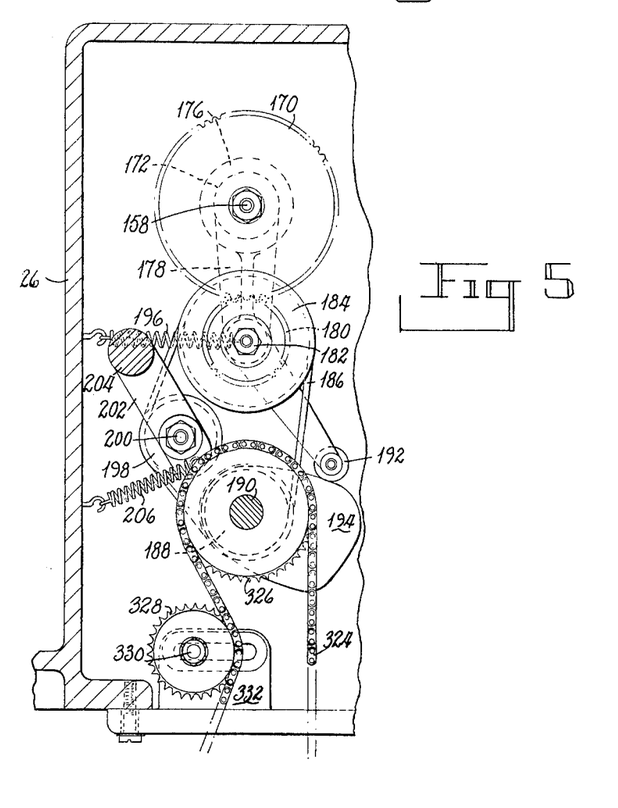
FIGURE 5 is a sectional view of parts of the machine shown in FIGURE 3 showing part of the drive, including means for reversing the direction of rotation of a first tool but shown as positioned at the end of a cycle of operation of the machine.

The machine now to be described is a machine suitable for use in smoothing the outer surfaces of cup blanks in the manufacture of pottery and comprises a base portion 20 (FIGURE 1) and, secured thereon, a lower housing 22 (FIGURES 1 and 4) having a flat top 24, the main drive of the machine being accommodated in the lower housing 22. Mounted on the flat top 24 is an upper housing 26 (FIGURES 1, 2, 3, 5, 8 and 9) which provides a support for three tools of the machine generally designated 28, 30 and 32 respectively.

The machine also comprises a work support in the form of a chuck generally designated 34 (FIGURE 10) and arranged to receive an inverted cup blank C. The chuck 34 comprises a body portion 36 with a flat-topped annular flange 38 on which is stuck an annulus 40 of rubbery material, preferably polyvinyl chloride, the annulus being a ring of uniform composition an inner surface of which is of concave contour. The body portion 36 is provided with a central upstanding pillar 42 and slidable heightwise thereof is a cup-shaped element 44 an upper rim of which is formed as an out-turned flange 46 which is arranged to overlap the annulus 40. The end portion 48 of the pillar 42 remote from the body portion 36 is of reduced diameter and supports thereon a flanged element 50 accommodated within the cup-shaped element 44 in such a manner as to provide an air-tight seal therewith and also thus to form therewith a chamber 52. Bonded to the flange of the flanged element 50 is a pad 54 of plasticized polyvinyl chloride in which is formed a central bore 56 to prevent an airlock when a cup blank is placed thereon. The body portion 36 of the chuck is provided with a tapped bore 58 which extends as a passage 60 to two outlets 62 in the pillar 42, the outlets opening into the chamber 52 formed by the cup-shaped element 44 and the flanged element 50. The body portion 36 of the chuck 34 is provided on its under-surface with a recess for receiving a projecting portion of a second body portion 64 having an integral wall 66 extending downwardly therefrom. The tapped bore 58 of the body portion 36 receives the threaded upper end portion of a rotatable spindle 68 which passes also through the second body portion 64 to which the spindle 68 is keyed, the body portion 36 being adjustable heightwise relative to the spindle 68 and the second body portion 64 being provided with a screw 70 for securing the said second body portion 64 adjacent to the body portion 36 in its adjusted heightwise position whereby to maintain the body portion 36 in said adjusted position. The rotatable spindle 68 is supported by means of a sleeve member 72 accommodated at its upper end portion between the spindle 68 and the depending wall 66 of the second body portion 64, the sleeve member 72 being secured in the flat top 24 of the lower housing 22 of the machine. A port 74 is formed in the lower end portion of the sleeve member through which air under pressure may be admitted into the sleeve portion, the rotatable spindle 68 having formed therein a central bore 76 arranged to run in continuity with the passage 60 in the body portion 36 of the chuck 34, whereby air under pressure is admitted from a suitable source of supply into the chamber 52. In this way air under pressure is effective to move the cup-shaped element 44 relative to the body portion 36 of the chuck 34 whereby to compress the annulus 40 axially and expand the annulus radially, an inverted cup blank C placed on the chuck being thus gripped thereon by the engagement of the annulus 40 with the inner surface of the cup blank.

Figure 10:
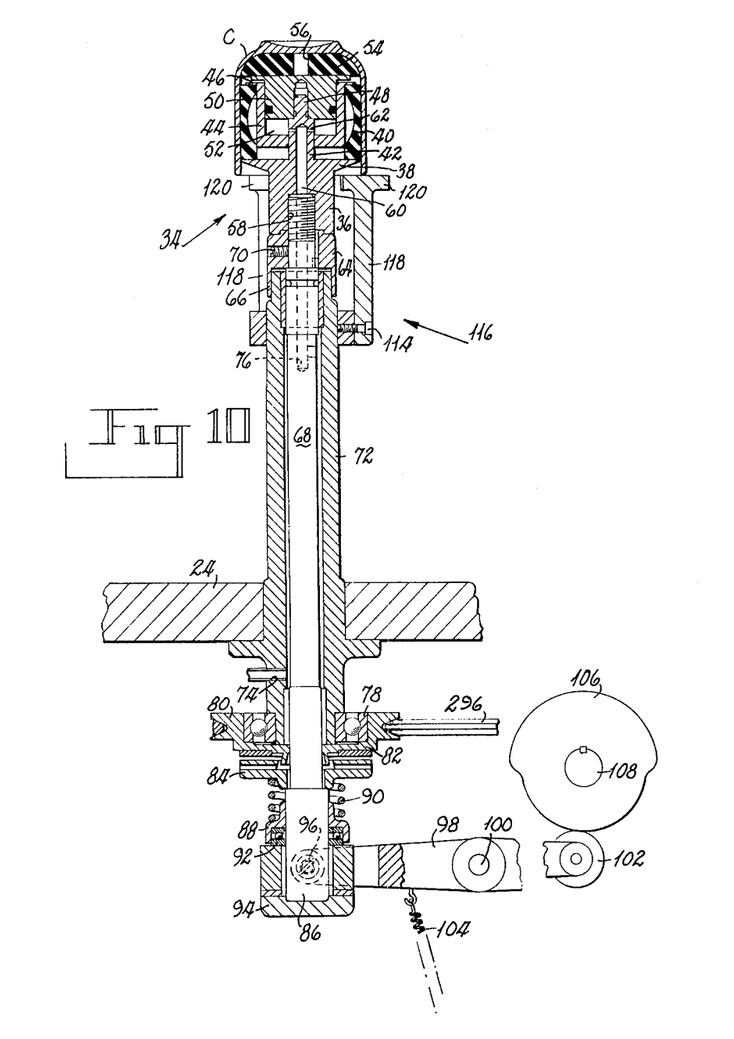
FIGURE 10 is a sectional view of the work support and edge gauge of the machine.

At the lower end of the sleeve member 72 is a bearing 78 about which a pulley 80 is mounted for rotation, the pulley 80 being formed integral with a first clutch member 82 that is rotatable about the spindle 68 and arranged to engage with a second clutch member 84 in the operation of the machine, the first clutch member 82 being arranged to rotate continuously in said operation of the machine. The second clutch member 84 is fixedly mounted on the lower end portion of the spindle 68 adjacent a shoulder formed by a portion 86 of the spindle of enlarged diameter. A collar 88 having a flange turned downwards is mounted on the portion 86 of the spindle and a spring 90 is accommodated between the under-surface of the second clutch member 84 and the collar 88, the spring being effective to urge the clutch member upwardly into engagement with the first clutch member 82. Accommodated within the flange of the collar 88 is a thrust bearing 92 supported on a cup-shaped member 94 in which the lower end portion of the spindle 68 is accommodated for rotation therein. The member 94 is supported by means of two screws 96 in a bifurcated end portion of a lever 98 pivoted on a pin 100, the other end portion of the lever carrying a roller 102 arranged to be urged, by means of a spring 104, constantly into engagement with a cam 106 mounted on one end of a main drive shaft 108 of the machine. Also mounted on the main drive shaft, at the end thereof remote from the cam 106, is a cam 110 which is effective to operate a valve 112 which controls the admission and exhaust of air under pressure into and out of the chamber 52. In the operation of the machine, as the main drive shaft 108 is caused to rotate, the cam 106 is effective through the lever to raise the member 94 and thus the spindle 68 whereby to cause the clutch members 82, 84 to engage and thus to cause the spindle and the chuck 34 to be rotated. Just before the spindle 68 is raised as aforesaid, the cam 110 is operative to cause the cup blank C to be gripped on the chuck 34. At the end of each cycle of operation of the machine, the cam 106 is effective to lower the sipndle 68 thus causing rotation thereof to be curtailed and thereafter the cam 110 is operative to cause the cup blank C to be released.

Secured by means of screws 114 (one only shown in FIGURE 10) towards the upper end portion of the sleeve member 72 is an edge gauge generally designated 116 comprising three legs 118 extending upwardly towards the chuck 34, each leg having at its upward extremity a flattened portion forming a pad 120 on which the top-edge of an inverted cup blank C may be supported when placed on the chuck. The edge gauge is adjustable heightwise by means of the screws 114 for securing the legs 118 to the sleeve member 72, whereby to accommodate different heights of cup blanks to be operated upon. In the operation of the machine, the raising and lowering of the spindle 68 is effective to lift a cup blank away from the edge gauge at the start of a cycle of operation of the machine after the blank has been gripped by the chuck 34 and to return it to the edge gauge at the end of said cycle prior to its being released by the chuck.

The first tool 28 (FIGURES 6 and 7) of the machine comprises a circular housing 122 which supports three arms 124 (one only shown in FIGURES 6 and 7) which are spaced equidistantly from one another and one only of which is now to be described. Formed integral with a back plate 126 of the housing 122 is a bracket 128 of U-shaped cross-section (there being altogether three such brackets) between the sides of which is mounted on a pin 130 one end portion of the arm 124 which extends through a hole 132 in the side wall of the housing 122, a rubber seal 134 being provided to prevent particles of clay or dust from entering within the housing 122. The arm 124 is mounted for limited swinging movement about the pin 130, such movement being limited in an anticlockwise (viewing FIGURE 6) direction by a stop screw 136 which is accommodated in the end portion of the arm 124 and abuts against the base of the U-shaped bracket and which can be adjusted to vary the amount of swinging movement permitted. The arm 124 is urged in such anticlockwise direction by means of a spring 138 secured at one end on the side wall of the housing 122 and at the other end on a pin 140 secured on the arm 124. Each arm 124 is provided, at the end portion thereof remote from the pin 130, with a tapped bore which receives a threaded end portion of a rod 142, on the other end portion of which is secured a metal holder 144 for a sponge 146, which sponge forms a work-engaging element of the first tool of the machine. The rod 142 is adjustable relative to the arm 124 and a locknut 148 is provided to secure the rod 142 in its adjusted position. In the operation of the machine, the sponge 146 is carried into an operating locality in which it strokes the side wall of an inverted cup blank C supported on the chuck 34 and is urged by engagement with the said side wall in a clockwise direction (viewing FIGURE 6) against the influence of the spring 138 which is thus effective at the same time to cause the sponge 146 to exert sufficient pressure on the blank to insure that the smoothing operation thereon is carried out satisfactorily.

Figure 6:
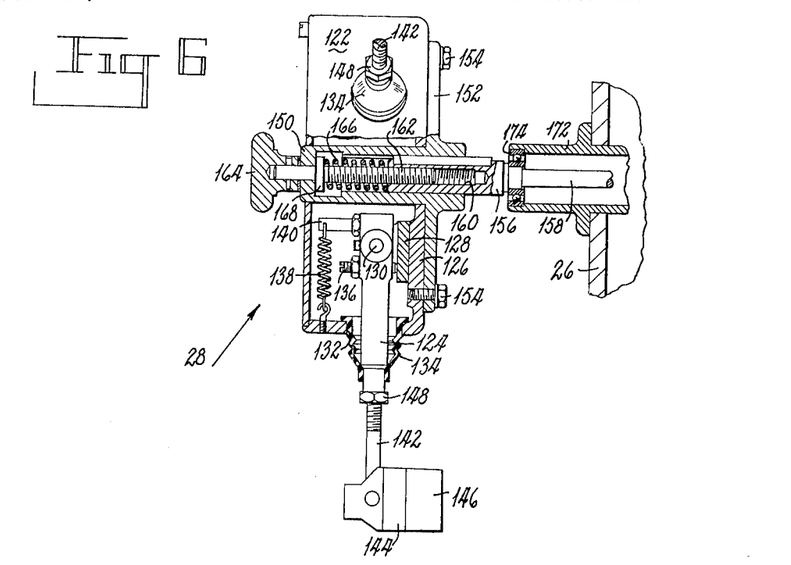
FIGURE 6 is a sectional view, with parts broken away, of the first tool of the machine.
Figure 7:
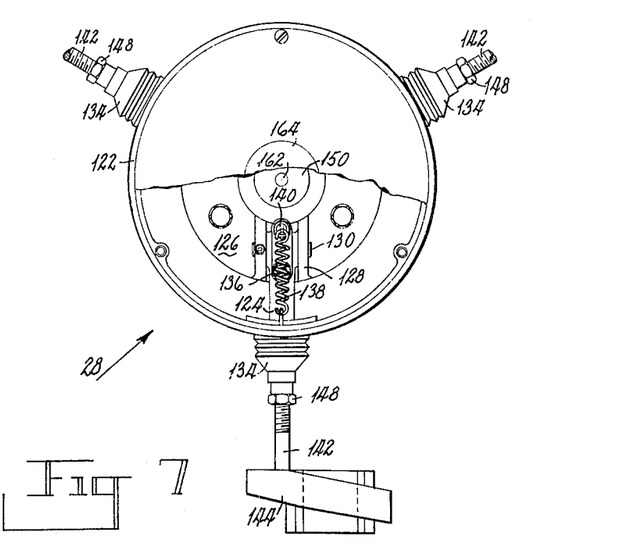
FIGURE 7 is a side view, with parts broken away, of the first tool.
Figure 8:
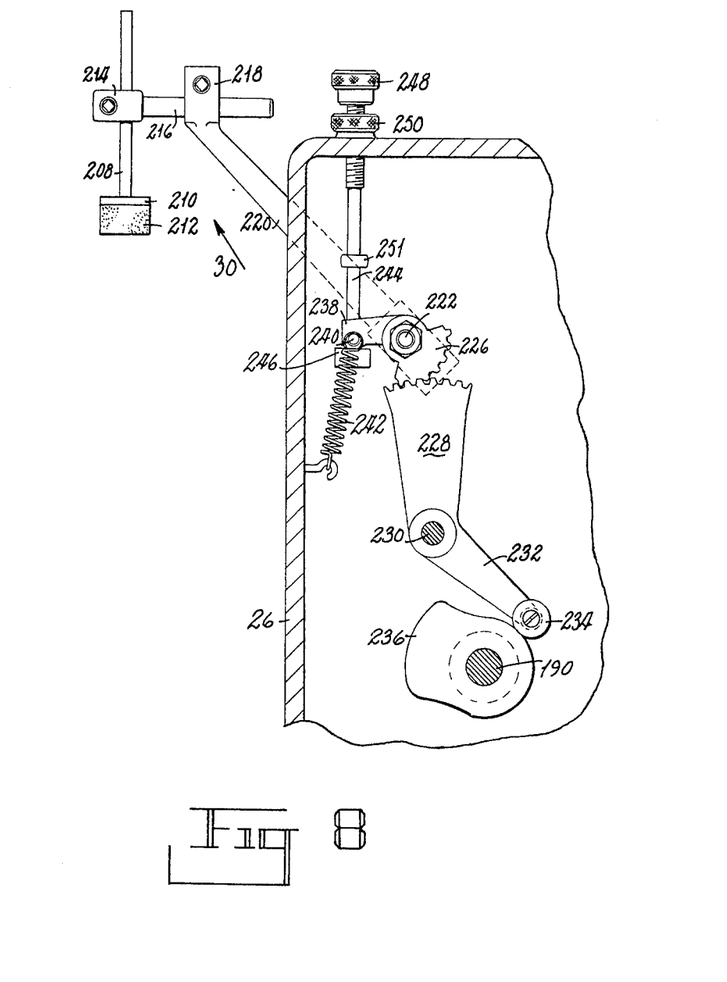
FIGURE 8 is a fragmentary view, partly in section, of the second tool (viz. the tool arranged to smooth the bottom of cup blanks) and of the second cam and associated parts that are effective to move the tool into and out of its operative position.
Figure 9:
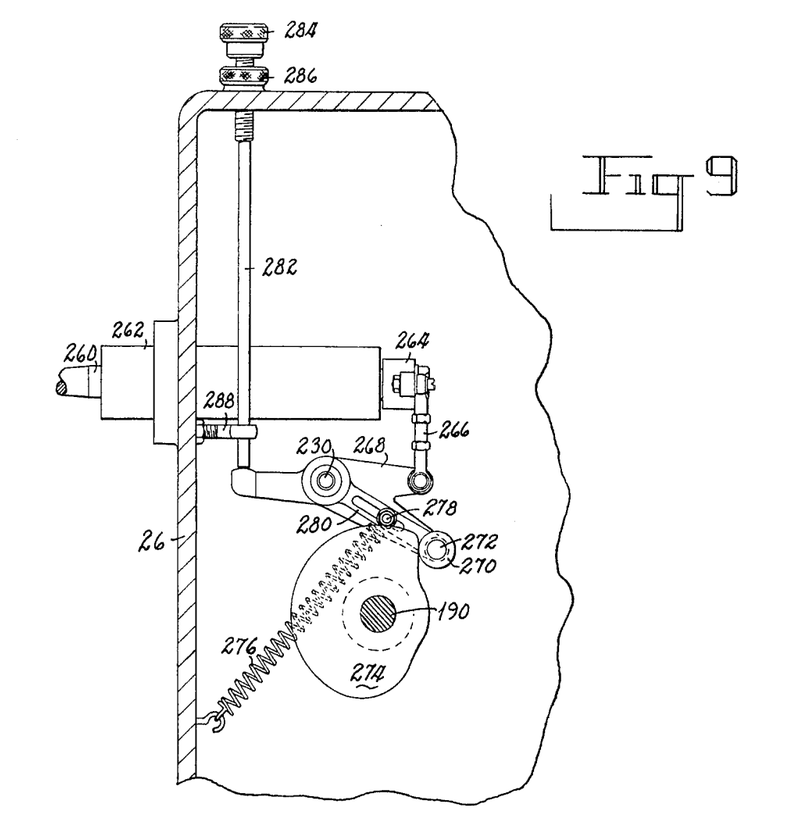
FIGURE 9 is a fragmentary view, partly in section, of the third cam and associated parts that are effective to move the third tool into and out of its operative position.

Passing through the centre of the circular housing 122 is a flanged bush 150 the flange 152 of which is secured to the back plate 126 of the housing by means of screws 154. The bush 150 is keyed on to an end portion 156 of enlarged diameter of a shaft 158 which thus serves as a support for the first tool 28. The portion 156 of the shaft 158 is provided with a tapped bore 160 which receives a threaded bolt 162 extending lengthwise of the bush 150 and provided at its end remote from the shaft 158 with a knob 164 to facilitate turning of the bolt 162. A spring 166 is arranged to act between the end of the portion 156 of the shaft 158 and a collar 168 on the bolt 162, that abuts against an inturned flanged portion of the bush 150, whereby to hold the bolt 162 against unintended rotation. Rotation of the bolt 162 using the knob 164 is effective to vary the relative positions of the portion 156 of the shaft 158 on the one hand and the bolt 162 and thus also the bush 150 on the other. In this way the position of the first tool 28 may be adjusted transversely of the machine relative to the chuck 34 for different thickness of ware to be operated upon.

Secured at the end of the shaft 158 remote from the portion 156 thereof is a pinion 170 (FIGURE 5), the shaft being supported in a cylindrical support member 172 mounted in the upper housing 26; two bearings 174 (one only shown in FIGURE 6) are provided, one at either end of the member 172 to facilitate rotation of the shaft 158 therein. Mounted for limited rotational movement about the outside of the support member 172 adjacent the pinion 170 is a collar 176 which forms an integral part of one end portion of a lever 178, the lever being thus supported on the member 172. The lever 178 carries, at an intermediate portion thereof, a second pinion 180 arranged to engage with the pinion 170, the second pinion 180 being freely mounted on the lever by means of a pin 182 and there also being mounted on the pin a pulley 184 secured to the pinion 180. The pulley 184 is connected by means of a belt 186 to a pulley 188 fixedly mounted on a main cam shaft 190 that extends transversely of the machine. The other end portion of the lever 178 carries a roller 192 arranged to engage a first cam 194 mounted on the shaft 190, a spring 196 acting between a hook on the upper housing 26 and the lever 178 whereby to urge the roller constantly into such engagement. For maintaining the belt 186 tensioned correctly a third pulley 198 is mounted by means of a pin 200 at one end portion of a link 202, the link being pivotally supported on a short shaft 204 and constantly urged in a clockwise (viewing FIGURE 5) direction by means of a spring 206; the shaft 204 is secured to the upper housing 26 of the machine.

Mounted on the top 24 of the lower housing of the machine and below the first tool 28 is secured a trough 201 (FIGURES 1 and 2) in which water may be contained and which is so arranged that the sponges 146 carried on their respective arms 124 dip into the water as the first tool rotates in the operation of the machine. A squeeze-roll 203 is arranged to be engaged by each successive sponge as it rises out of the water to squeeze any surplus water therefrom, the squeeze-roll 203 being mounted on a bracket 205 on the wall of the upper housing 26. A plate 207 is adjustably mounted at the end of the squeeze-roll remote from the bracket 205 and is so arranged as to prevent the sponge 146 from swinging about its pin 130 away from the squeeze-roll 203 on engagement therewith.

In the operation of the machine, rotation of the main cam shaft 190 is thus effective through the pulleys 184, 188 and pinions 170, 180 to cause clockwise (viewing FIGURE 5) rotation of the shaft 158 on which the first tool 28 is mounted. Once during each revolution of the cam shaft 190, however, the first arm 194 is effective to cause the lever 178 to swing about the support member 172 against the influence of the spring 196, thereby carrying the pinion 180 in an anti-clockwise (viewing FIGURE 5) direction about the pinion 170, i.e. against the direction of rotation of the shaft 158. Thus the rotation of the shaft 158 is momentarily checked and reversed for a few degrees of revolution once during each cycle of operation of the machine.

The second tool 30 (FIGURES 3 and 8) of the machine comprises a rod 208 which supports at one end thereof a metal holder 210 for a piece of sponge material 212 constituting the work-engaging surface of the second tool. The rod 208 is received, towards its other end portion, in a split bearing 214 formed at one end portion of a second rod 216 which, in turn, is similarly received in a split bearing 218 formed at one end portion of an arm 220. In this way the second tool 30 can be adjusted both heightwise and forwardly and rearwardly of the machine. The arm 220 is mounted at its other end portion on a shaft 222 extending transversely of the machine, said shaft 222 passing through the wall of the upper housing 26 and being supported by a cylindrical support member 224 secured thereto bearings (not shown) being provided at either end of the member 224 to facilitate rotation of the shaft 222 therein. Secured on the end portion of the shaft 222 remote from the arm 220 is a toothed segment 226 arranged to engage with a second toothed segment 228 pivotally mounted on a shaft 230 supported on the wall of the upper housing 26, said second toothed segment constituting one arm of a bell crank lever 232 the other arm of which carries a roller 234 arranged to engage a second cam 236 of the machine fixedly mounted on the main cam shaft 190. The toothed segment 226 is formed with an integral projecting portion 238 which carries a pin 240 between which and a hook on the wall of the upper housing 26 a spring 242 is acting, said spring being effective through the toothed segments 226, 228 to urge the roller 234 constantly into engagement with the cam 236. Rotation of the toothed segment 226 under the influence of the spring 242 is limited by a stop member 244 received in a bifurcated end portion of the projecting portion 238 and provided with an end portion 246 of enlarged diameter against which the projecting portion abuts. The other end portion of the stop member 244 is threaded and is received in a tapped bore formed in the top of the upper housing 26 whereby the heightwise position of the stop member can be adjusted. A knurled knob 248 is provided on the upper end of the stop member to facilitate turning the said member by hand and also a knurled locknut 250 is provided for securing the stop member in its adjusted position. An intermediate support 251 is also provided, said support being secured to the wall of the upper housing 26. In the operation of the machine, the cam 236 is effective, once during each cycle of operation of the machine, to allow the second tool 30 to be lowered, under the influence of the spring 242, into engagement with the bottom of a cup blank C placed on the chuck 34 and subsequently to be raised out of said engagement towards the end of said cycle.

The third tool 32 (FIGURES 1 and 2) of the machine comprises a rod 252 carrying a metal holder 254 which supports an abrasive stone 256 suitably shaped for operating on top edges of cup blanks, the end portion of the rod remote from the holder being formed as a split bearing 258 and mounted on an end portion of a shaft 260 (FIGURE 9) extending forwardly and rearwardly of the machine. The shaft 260 is supported in a cylindrical support member 262, bearings (not shown) being provided at either end thereof to facilitate rotation of the shaft 260 remote from the rod 252 is mounted an arm of the upper housing 26. At the end portion of the shaft 260 remote from the rod 252 is mounted on arm 264 (FIGURES 3 and 9) to an end portion of which is pivotally connected one end portion of a link 266 the length of which is adjustable. The other end portion of the link 266 is pivotally connected to one arm of a three-armed lever 268 mounted on the shaft 230 (on which the bell crank lever 232 is also mounted). A second arm of the lever 268 carries a roller 270 mounted on a pin 272 and arranged to engage a third cam 274 fixedly mounted on the main cam shaft 190, the roller 270 being constantly urged clockwise (viewing FIGURE 9) into engagement with the cam by means of a spring 276 arranged to act between a hook on the wall of the upper housing 26 and a pin 278 adjustably mounted in a slotted link 280 which is pivotally mounted on the shaft 230 and through which the pin 272 passes. Clockwise movement of the lever 268 is limited by a stop member 282 extending heightwise of the machine, the third arm of the lever 268 being arranged to abut thereagainst. The upper end portion of the stop member 282 is threaded and is received in a tapped bore in the top of the upper housing 26 whereby the heightwise position of the stop member can be adjusted, a knurled knob 284 being provided to facilitate turning of the stop member by hand and a knurled locknut 286 being provided to secure the stop member in its adjusted position. An intermediate support 288 is also provided, said support being secured to the wall of the upper housing 26. In the operation of the machine, the cam 274 is effective through the lever 268, link 266 and shaft 260 to raise the third tool 32, once during each cycle of operation of the machine, into engagement with the top edge of a cup blank C placed on the chuck 34 and to lower it out of said engagement towards the end of said cycle.

For imparting drive to the machine there is provided, in the lower housing 22 thereof (FIGURE 4), an electric motor 290 a drive shaft 292 of which extends heightwise of the machine and supports thereon a pulley 294 connected by means of a belt 296 to the pulley 80 (mounted on the spindle 68 of the chuck 34) and another pulley 298. The pulley 298 is mounted on a shaft 300 extending heightwise of the machine and supported in a bush formed integral with a first arm of a bell crank lever 302 which, in turn, is mounted on a shaft 304 supported by a bracket 306 secured to the floor of the lower housing 22. Also mounted on the bracket 306 for rotation about a pin 308 is a pulley 310 round which the belt 296 is arranged to pass. At the lower end position of the shaft 300 is mounted another pulley 312 connected by a belt 314 to a pulley 316 mounted on a shaft 318 that forms part of a transmission arrangement generally designated 320 by means of which drive is imparted to the main drive shaft 108 of the machine. Mounted adjacent the cam 110 on the main drive shaft 108 is a sprocket 322 connected by means of a chain 324 to a sprocket 326 fixedly mounted on the main cam shaft 190 of the machine, a third sprocket 328 being mounted on a pin 330 adjustably positioned in a slotted bracket 332 secured on the top of the lower housing 22.

The speed at which the machine operates is variable. At the front of the upper housing 26 is a bracket 334 which is secured to the floor of the housing and which supports one end portion of a rod 336 extending forwardly and rearwardly of the machine and accessible through a hole in the wall of the upper housing, the rod being held against movement forwardly and rearwardly of the machine by two locking collars 338 mounted on the rod one on either side of the bracket 334. The other end portion of the rod 336 is threaded and received in a tapped bore in a depending element (not visible) pivotally mounted by means of a pin 340 on the second arm of the bell crank lever 302. The pulley 312 mounted on the first arm of the bell crank lever 302 is a variable speed pulley, i.e. a pulley the operative diameter of which is variable dependent upon the pressure of the belt which passes round it. Rotation of the rod 336 is thus effective to cause the bell crank lever 302 to be moved about the shaft 304 whereby to vary the distance between the pulley 312 carried on the first arm of the bell crank lever and the pulley 316 and thus to vary the tension in the belt 314 that connects them.

Figure 1:
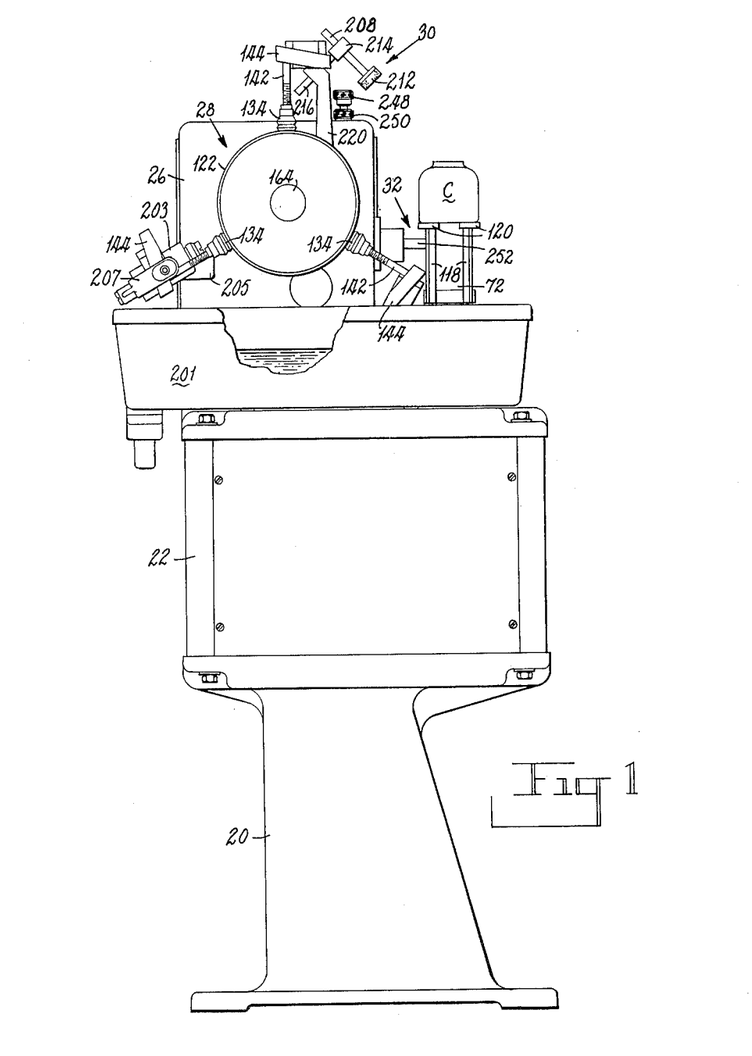
FIGURE 1 is a left-hand side elevation of the machine, with parts broken away, showing the machine at the end of a cycle of operation thereof.
Figure 2:
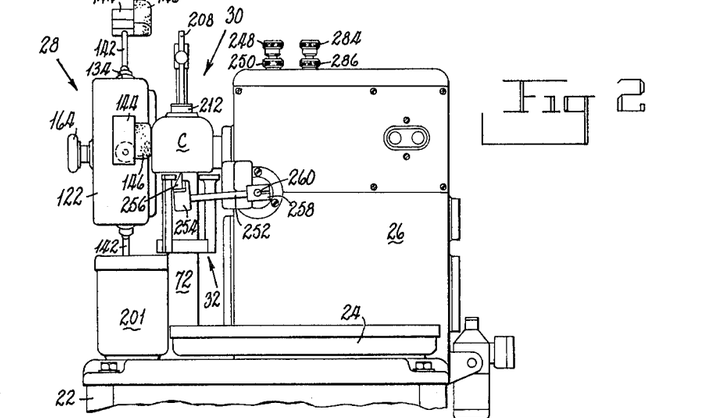
FIGURE 2 is a front view of upper parts of the machine showing the machine with the three tools thereof in operative positions.
Figure 3:
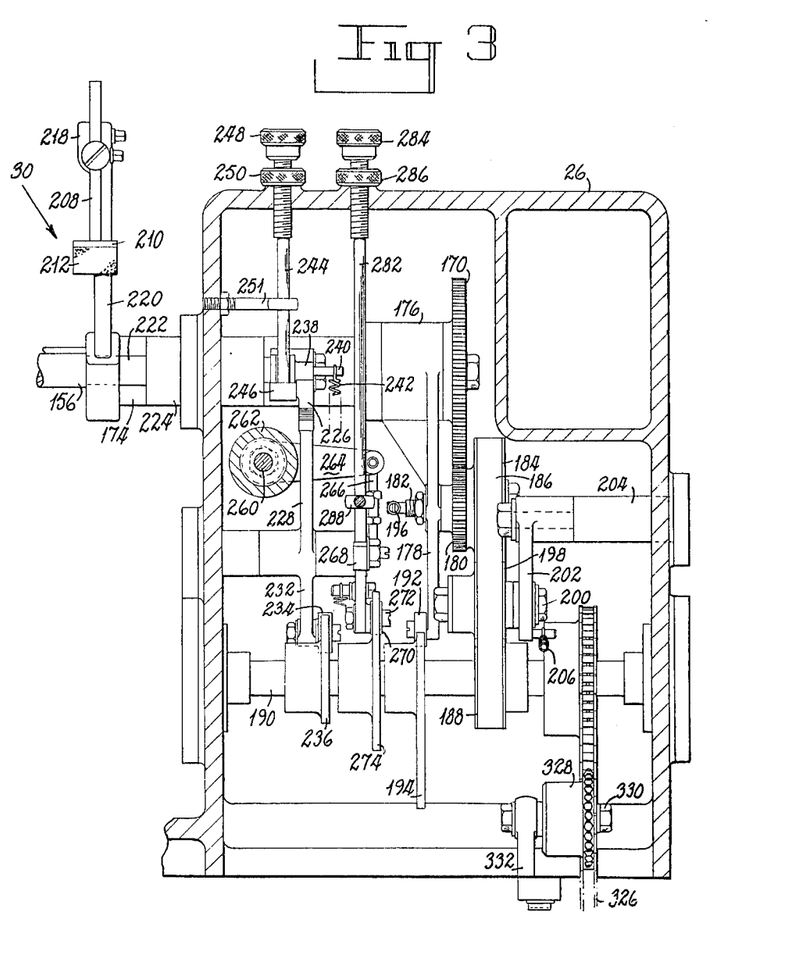
FIGURE 3 is a front view, partly in section and with parts broken away, of upper parts of the machine showing the positions of the drive, the main cam shaft and three cams when the tools are in the same positions as in FIGURE 2.

In the operation of the machine, which machine is arranged to operate continuously, the operator places an inverted cup blank C over the chuck 34 while the machine is in the position shown in FIGURE 1, the top edge of the blank being thus correctly positioned by engagement with the edge gauge 116. As rotation of the main drive shaft 108 is continued the valve 112 is actuated by the cam 110 and air under pressure is allowed into the chamber 52 formed between the cup-shaped element 44 and the flanged element 50 whereby the annulus 40 of the plasticized polyvinyl chloride is expanded radially to grip the inner wall of the cup blank C. Shortly thereafter the cam 106 is effective to cause the spindle 68 and thus the chuck 34 to be raised (to move the cup blank away from the edge gauge) and at the same time to engage the clutch members 82, 84 whereby rotation of the spindle 68 is initiated. The first tool 28, which comprises three separate work-engaging sponges 146 spaced equidistantly about the axis of rotation of the tool, and which rotates continuously in a clockwise (viewing FIGURE 1) direction during the operation of the machine to bring each sponge in turn into an operating locality in which it strokes the side wall of a cup blank gripped on the work support, is now caused to operate on the cup blank C by the stroking action of a sponge 146 on the side wall thereof. At the same time a second sponge is about to enter, or has just entered, into the water trough 201 and the third sponge is being, or has just been, squeezed by the squeeze-roll 203 to remove any surplus water therefrom. On engaging the cup blank the sponge 146 is caused to swing on its arm 124 about the pin 130 against the influence of the spring 138 which thus causes pressure to be exerted on the said side wall. While the first tool 28 is thus in operative engagement with the side wall of the cup blank, the second and third tools 30, 32 are brought into operative engagement, by the action of the cams 236, 274 respectively, with the bottom and the top edge of the cup blank respectively. Towards the end of the cycle of operation of the machine, when the sponge 146 of the first tool 28 has moved out of operative engagement with the cup blank C, the first cam 194 is effective to cause the pinion 180 to be swung in an anticlockwise (viewing FIGURE 5) direction whereby momentarily to check and reverse for a few degrees of revolution the rotation of the shaft 158 and thus of the first tool 28. In this way a work-engaging surface of the sponge 146, which has now been returned under the influence of the spring 138 to its original position, is brought into operative engagement with the top edge of the cup blank C. In the meantime the second and third tools 30, 32 have been moved out of operative engagement with the cup blank. The first tool 28 is then caused to continue its clockwise rotation, the cam 106 is effective to lower the spindle 68 and at the same time cause the rotation thereof to be curtailed, and the cam 110 is then operative to release the valve 112 whereby the air under pressure is allowed to exhaust from the chamber 52 and the annulus 40 releases its grip on the inner wall of the cup blank C which the operator then removes from the chuck and replaces with another blank to be operated upon.

Whereas the machine is a single-hand machine arranged to be fed by hand, it will be realised that a similarly constructed machine having two or more heads can be arranged to be fed automatically from a conveyor by means of a transfer device, for example a device that picks up inverted cup blanks by suction, places them in succession on a chuck, and subsequently removes them in the same manner to deposit them on the same or on another conveyor for transportation in readiness for a subsequent operation thereon.

Having thus described our invention, what we claim as new and desire to secure by Letters Patent of the United States is:

1. A machine for operating on hollow-ware ceramic blanks comprising a frame support, a work support mounted on the frame support for rotation about its axis and provided with means to grip a ceramic blank, and a tool mounted on the frame support and operative to stroke the side wall of the blank comprising a plurality of arms affixed to a housing rotatable about a fixed axis normal to said work support axis and adapted upon rotation of said housing to alternately stroke the side of the blank.

2. A machine for operating on hollow-ware ceramic blanks comprising a frame support, a work support mounted on the frame support for rotation about its axis and provided with means to grip a ceramic blank, a tool mounted on the frame support and operative to stroke the side wall of the blank comprising a plurality of arms affixed to a housing rotatable about a fixed axis normal to said work support axis and adapted upon rotation of said housing to alternately stroke the side of the blank, and a second tool mounted on the frame support and operative to smooth the bottom of the blank.

3. A machine for operating on hollow-ware ceramic blanks comprising a frame support, a work support mounted on the frame support for rotation about its axis and provided with means to grip a ceramic blank, a tool mounted on the frame support and operative to stroke the side wall of the blank comprising a plurality of arms affixed to a housing rotatable about a fixed axis normal to said work support axis and adapted upon rotation of said housing to alternately stroke the side of the blank, and a tool mounted on the frame support and operative to trim the top edge of the blank.

4. A machine for operating on hollow-ware ceramic blanks comprising a frame support, a work support mounted on the frame support for rotation about its axis and provided with means to grip a ceramic blank, a tool mounted on the frame support and operative to stroke the side wall of the blank comprising a plurality of arms affixed to a housing rotatable about a fixed axis normal to said work support axis and adapted upon rotation of said housing to alternately stroke the side of the blank, a second tool mounted on the frame support and operative to smooth the bottom of the blank, and a third tool mounted on the frame support and operative to trim the top edge of the blank.

5. A machine for operating on hollow-ware ceramic blanks comprising a frame support, a work support mounted on the frame support for rotation about its axis and provided with means to grip a ceramic blank, a tool mounted on the frame support and operative to stroke the side wall of the blank comprising a plurality of arms affixed to a housing rotatable about an axis transverse to said work support axis and adapted upon rotation of said housing to alternately stroke the side of the blank, a tool mounted on the frame support and operative to trim the top edge of the blank, and means operative to smooth the top edge of the blank after completion of the top edge trimming operation comprising means for applying one of the side stroking arms to the top edge.

6. A machine for operating on hollow-ware ceramic blanks comprising a frame support, a work support mounted on the frame support for rotation about its axis and provided with means to grip a ceramic blank, means for moving the work support into operative position, a tool mounted on the frame support and operative to stroke the side wall of the blank comprising a plurality of arms affixed to a housing rotatable about an axis transverse to said work support axis and adapted upon rotation of said housing to alternately stroke the side of the blank, a tool mounted on the frame support and operative to trim the top edge of the blank, means operative to smooth the top edge of the blank after completion of the top edge trimming operation comprising means for applying one of the side forming arms to the top edge, and indexing means mounted on the frame support for actuating the work support and operative tools in time relationship thereby to cooperatively engage the blank.

7. A machine for operating on hollow-ware ceramic blanks comprising a frame support, a work support mounted on the frame support for rotation about its axis and provided with means to grip a ceramic blank, a tool mounted on the frame support and operative to stroke the side wall of the blank comprising a plurality of arms affixed to a housing rotatable about an axis transverse to said work support axis and adapted upon rotation of said housing to alternately stroke the side of the blank heightwise.

8. A machine for operating on hollow-ware ceramic blanks comprising a frame support, a work support mounted on the frame support for rotation about its axis and provided with means to grip a ceramic blank, a tool mounted on the frame support and operative to smooth the side wall of the blank comprising a plurality of arms adapted to alternately stroke the side of the blank heightwise, and a second tool mounted on the frame support and operative to smooth the bottom of the blank.

9. A machine for operating on hollow-ware ceramic blanks comprising a frame support, a work support mounted on the frame support for rotation about its axis and provided with means to grip a ceramic blank, a top edge gauge disposed around the work support, a tool operative to smooth the side wall of the blank comprising a plurality of arms affixed to a housing mounted on the frame support for rotation about an axis transverse to said work support axis and adapted upon rotation of said housing to alternately stroke the side of the blank heightwise, the outer ends of said arms comprising side sponge members, means for yieldably urging the side sponge members against the side of the blank, a tool mounted on the frame support and operative to trim the top edge of the blank, means operative to smooth the top edge of the blank after completion of the top edge trimming operation comprising means for applying one of the side sponge members to the top edge, and cam means mounted on the frame support for actuating the work support and operative tools in timed relationship thereby to cooperatively engage the blank.

10. A machine for operating on hollow-ware ceramic blanks comprising a frame support, a work support mounted on the frame support for rotation about its axis and provided with means to grip a ceramic blank, a tool mounted on the frame support and operative to smooth the side wall of the blank comprising a plurality of arms affixed to a housing rotatable about an axis transverse to said work support axis and adapted upon rotation of said housing to alternately stroke the side of the blank heightwise, the outer ends of said arms comprising side sponge members, means mounted on the frame support for wetting each side sponge member during a rotational cycle, and means mounted on the frame support for squeezing the side sponge members after their removal from the wetting means.

11. A machine for operating on hollow-ware ceramic blanks comprising a frame support, a work support mounted on the frame support for rotation about its aixs and provided with means to grip a ceramic blank, a tool mounted on the frame support and operative to smooth the side wall of the blank comprising a plurality of arms adapted to alternately stroke the side of the blank heightwise, the outer ends of said arms comprising side sponge members, and a second tool mounted on the frame support and operative to smooth the bottom of the blank comprising a bottom sponge member and means for yieldably applying the bottom sponge member to the bottom of the blank.

12. A machine for operating on hollow-ware ceramic blanks comprising a frame support, a chuck mounted on the frame support, said chuck having an expandable annulus and adapted to grip a ceramic blank, a top edge gauge disposed around the chuck and adapted to receive the top edge of the blank, a spindle connected to the chuck and adapted to raise the blank off the edge gauge, means mounted on the frame support for rotating the spindle and chuck, a shaft mounted on the frame support having an axis transverse to the axis of the spindle, a plurality of arms fixed to the shaft, a side sponge fixed to the outer end of each of the arms, a side sponge wetting station mounted on the frame support through which each side sponge passes during a revolution of the shaft, a side sponge squeezing station mounted on the frame support, a blank engaging station in which a side sponge strikes the side of the blank heightwise of the blank, spring means in each arm adapted to yieldably urge the side sponge against the side of the blank, a bottom sponge mounted on the frame support and adapted to yieldably engage the bottom of the blank, and an abrasive member mounted on the frame support and adapted to trim the top edge of the blank, cam means mounted on the frame support and operative after completion of the top edge trimming operation to reverse the rotation of the shaft thereby to engage the top edge with a surface of one of the side sponges thereby to effect a smoothing operation, the spindle being adapted upon completion of the top edge smoothing operation to return the blank to the top edge gauge, the chuck being adapted to then release the blank.

13. The invention according to claim 6 in which said work support is a chuck comprising an expandable annulus, an axially movable element disposed within the annulus and in communication with a source of fluid under pressure, said element movable responsive to said fluid thereby to cause axial compression and radial expansion of said annulus, and said means for moving the work support comprises a rotatable spindle attached to the under side of the chuck and adapted to move the chuck axially.

14. The invention according to claim 13 in which the expansible annulus is made of plasticized polyvinyl chloride.

References Cited by the Examiner

UNITED STATES PATENTS

| | | | |
|---|---|---|---|
| 531,368 | 12/1894 | Fifield | 51—166.9 |
| 903,072 | 11/1908 | Farnham | 269—22 |
| 2,455,744 | 12/1948 | Emerson | 25—22 |
| 2,529,331 | 11/1950 | Ellis et al. | 25—22 |
| 2,587,271 | 2/1952 | Allen et al. | 25—22 |
| 2,615,599 | 10/1952 | Griffing et al. | 51—89 |
| 2,632,223 | 3/1953 | Jordan | 25—22 |
| 2,755,531 | 7/1956 | Arelt | 25—22 |
| 3,040,409 | 6/1962 | Elliott. | |

FOREIGN PATENTS

| | | |
|---|---|---|
| 585,291 | 2/1947 | Great Britain. |
| 730,646 | 5/1955 | Great Britain. |

WILLIAM J. STEPHENSON, *Primary Examiner.*

ROBERT F. WHITE, *Examiner.*